(12) United States Patent
Tomas Puchades

(10) Patent No.: US 10,107,321 B2
(45) Date of Patent: Oct. 23, 2018

(54) SYSTEM FOR SAFELY ASSEMBLING WASHING MACHINES FOR VEHICLES

(71) Applicant: ISTOBAL, S.A., La Alcudia (ES)

(72) Inventor: Yolanda Tomas Puchades, La Alcudia (ES)

(73) Assignee: Istobal, S.A., La Alcudia (ES)

( * ) Notice: Subject to any disclaimer, the term of this patent is extended or adjusted under 35 U.S.C. 154(b) by 0 days.

(21) Appl. No.: 15/360,119

(22) Filed: Nov. 23, 2016

(65) Prior Publication Data

US 2017/0152877 A1 Jun. 1, 2017

(30) Foreign Application Priority Data

Nov. 27, 2015 (ES) .............................. 201531321 U

(51) Int. Cl.
| | | |
|---|---|---|
| *E04B 1/36* | (2006.01) | |
| *F16B 7/22* | (2006.01) | |
| *B60S 3/04* | (2006.01) | |
| *B60S 3/06* | (2006.01) | |

(52) U.S. Cl.
CPC *F16B 7/22* (2013.01); *B60S 3/04* (2013.01); *B60S 3/06* (2013.01)

(58) Field of Classification Search
CPC ........ E04B 1/215; E04B 1/344; E04B 1/3441; E04B 1/1903; E04B 1/34357; E04B 1/34384; E04B 1/3447; E04B 1/3533
See application file for complete search history.

(56) References Cited

U.S. PATENT DOCUMENTS

| | | | | |
|---|---|---|---|---|
| 3,968,618 A * | 7/1976 | Johnson | ................ | E04B 1/3441 52/125.4 |
| 3,971,185 A * | 7/1976 | Hendrich | .............. | E04B 1/3447 52/71 |
| 4,078,353 A * | 3/1978 | Thesingh | ................ | E04B 1/344 52/223.6 |
| 4,244,384 A * | 1/1981 | Bean | ......................... | E04B 1/32 135/132 |
| 4,479,333 A * | 10/1984 | Hendrich | .................. | E04B 1/18 52/641 |
| 5,461,832 A * | 10/1995 | Smith | ..................... | E04B 1/344 52/143 |
| 6,430,887 B1 * | 8/2002 | Daudet | ................. | E04B 1/3441 16/223 |
| 9,062,448 B2 * | 6/2015 | Richardson | ........... | E04B 1/1903 |
| 9,217,248 B2 * | 12/2015 | Knepp | .................... | E04C 3/005 |
| 9,222,250 B2 * | 12/2015 | Peterson | ............... | E04B 1/3445 |
| 2004/0172898 A1 * | 9/2004 | Knepp | .................... | E02D 27/42 52/299 |
| 2005/0016111 A1 * | 1/2005 | Knepp | .................... | E02D 27/42 52/633 |

(Continued)

FOREIGN PATENT DOCUMENTS

DE 102004053357 A1 5/2006
WO 2008031674 A1 3/2008

*Primary Examiner* — Gisele D Ford
(74) *Attorney, Agent, or Firm* — The Webb Law Firm

(57) ABSTRACT

The system includes a structure including a crossbar and a series of pillars connected to the crossbar by hinged joining means, and a fixing system to secure each pillar to the crossbar, where the hinged joining means are configured to operate as the crossbar is lifted from the ground, causing the pillars to be lifted to a final position in which the fixing systems secure the pillars to the crossbar in a stable position.

2 Claims, 4 Drawing Sheets

(56) References Cited

U.S. PATENT DOCUMENTS

2010/0037406 A1    2/2010  Wimmer et al.
2011/0265421 A1*  11/2011  Kempf ................. E04B 1/2403
                                                          52/741.1

* cited by examiner

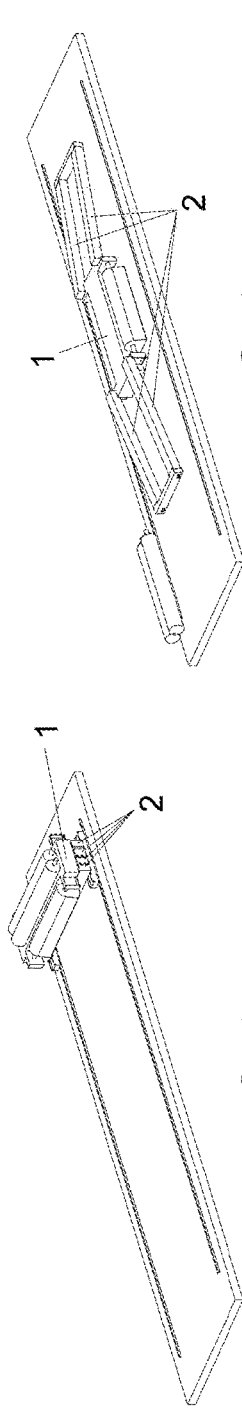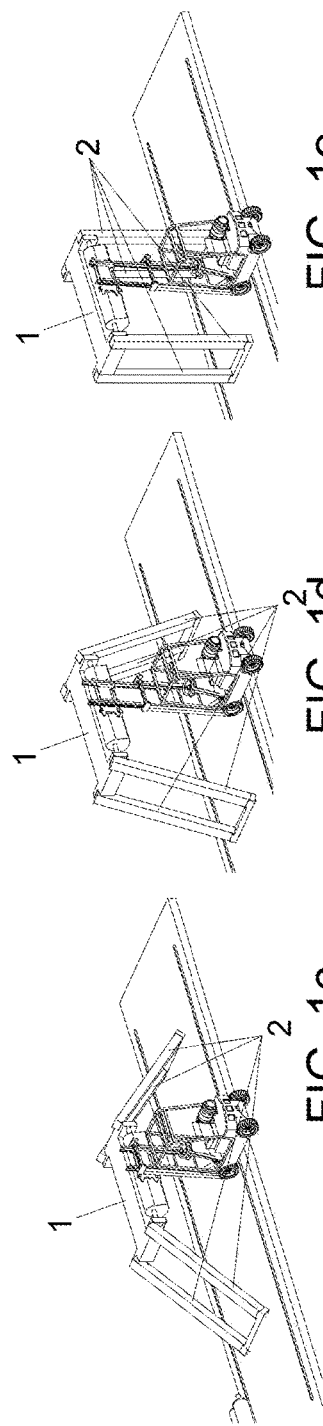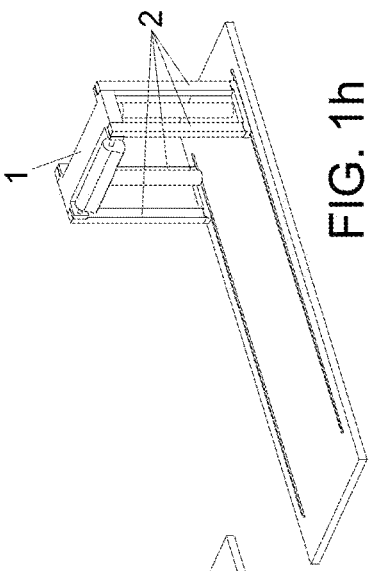

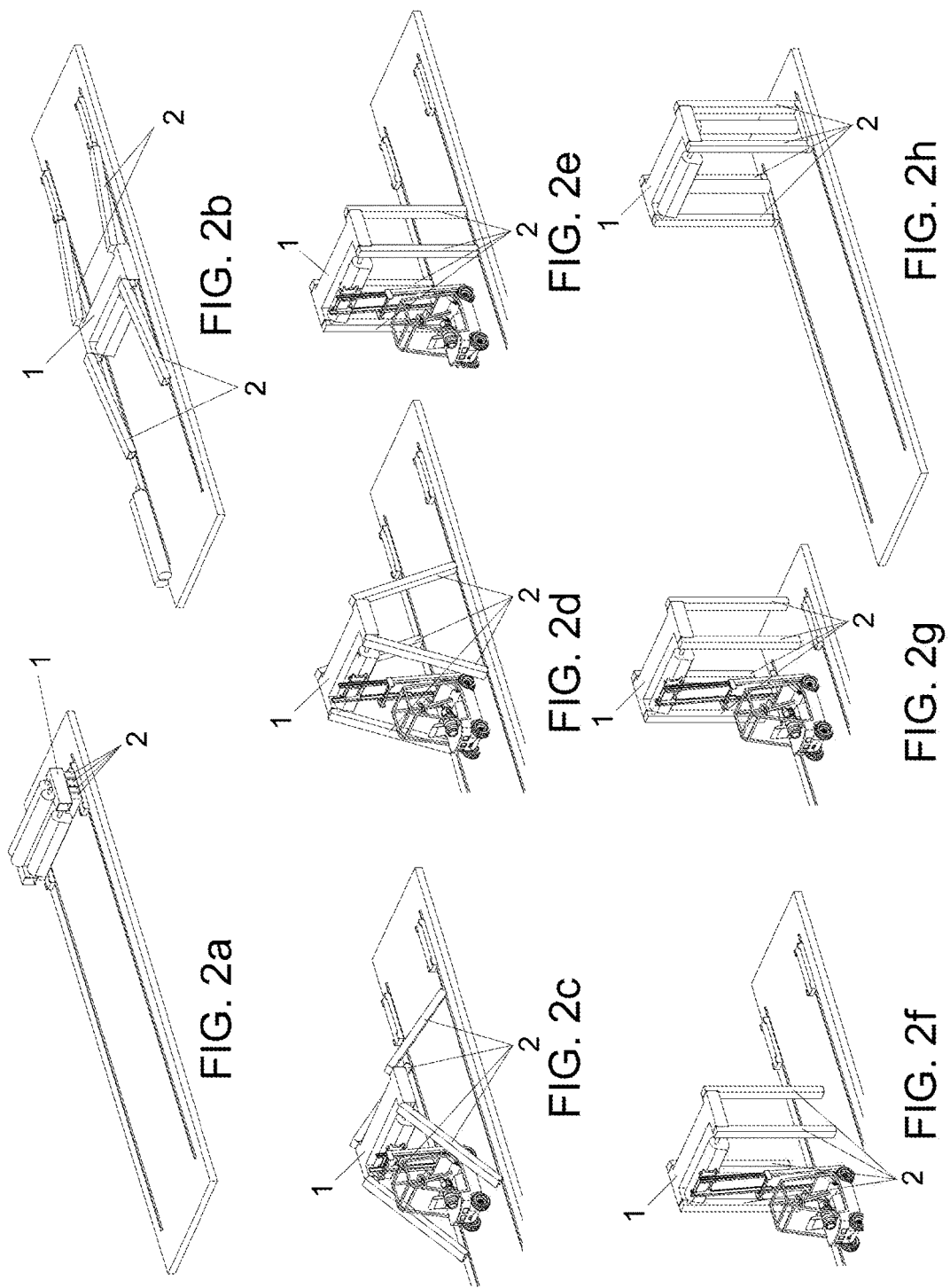

SYSTEM FOR SAFELY ASSEMBLING WASHING MACHINES FOR VEHICLES

CROSS-REFERENCE TO RELATED APPLICATION

This application claims priority to Spanish Utility Model Application No. U201531321 filed Nov. 27, 2016, the disclosure of which is hereby incorporated in its entirety by reference.

BACKGROUND OF THE INVENTION

Field of the Invention

The present invention refers to a system for assembling washing machines for vehicles in a safe way. The system of the invention uses an assembling system including a structure with hinged elements that are secured by fixing the structure. This system, firstly, does not incur additional costs compared to the current systems for assembling washing machines for vehicles, and secondly, it can be implemented on washing machines of any size, making the system useful both for machines used for washing utility vehicles as well as for industrial vehicles.

Description of Related Art

In the current state of the art, the machines used for washing industrial vehicles have very large structures that are transported in separate pieces and assembled at the washing facilities. The assembling methods currently used for assembling the structure of the washing machine consist of assembling the machine parts at the place where it will be operated by using means for lifting said parts, such as a tow truck or a forklift truck.

This assembling system has the drawback that the operators in charge of assembling the machine have to secure the assembled parts by means of fixing bolts when they are in lifted positions, which entails a risk.

The patent document WO2008031674A1 discloses an assembling system for washing machines for vehicles describing an assembling system in which the washing machine is assembled horizontally and is later lifted by means of a forklift truck. This method is useful for car wash machines of a much smaller size than the gantries used for industrial vehicles. The difference with the method provided is that, in said case, the machine is assembled in a horizontal position and then turned to its working position, which makes the operation of lifting the gantry entail some risks. In any case, the operation involved in lifting the washing gantry prevents the dimensions of the machine from being too large, not only due to the machinery needed to lift the structure but also because of the increased risk of the structure toppling to the ground, putting in danger both the structure and the safety of the workers.

Document DE102004053357 discloses a gantry for washing vehicles that is transported folded in a trailer and is unfolded at the place where the washing gantry is set up. The structure can pivot around its joints by means of hydraulic actuators in order to be erected vertically. It is designed so that the washing gantry can be removed when the washing operations are completed, making it a portable structure that can be easily disassembled. This invention has the drawback of the large investment made on the hydraulic system for assembling and disassembling the structure, which would not be necessary for those facilities that are intended to remain fixed, so that the expenditure would be excessive when they are used only once.

The present invention addresses the aforementioned problems by disclosing a system for assembling washing machines that simplifies the operation of lifting the structure by means of a fixing system that does not incur additional costs and that is not affected by the size of the machine, since it is perfectly valid for washing machines for both industrial and utility vehicles, also being able to make the installation using a forklift truck.

SUMMARY OF THE INVENTION

The present invention describes a system for safely assembling washing machines for vehicles including a structure in the shape of a gantry, which includes of a crossbar and a series of pillars connected to the crossbar.

The difficulty and the danger of assembling the structure at a certain height make it of interest to develop the system disclosed.

The present invention is carried out by placing the crossbar and the pillars including the structure of the machine on the ground at the place of assembly.

The system includes hinged joining means in order to connect the pillars of the structure to the crossbar. The process of connecting the hinges takes place while the components are still on the ground.

Once the pillars have been joined to the crossbar, the structure is lifted by means of a forklift truck lifting the crossbar. By means of the force of gravity, the pillars rotate on the hinged means around the crossbar, gradually losing their initial horizontal position.

When the pillars are in contact with the crossbar, a series of fixing means secure each pillar to the crossbar.

The fixed position can be released by accessing the free end of the gusset plate through a window located near the opening.

BRIEF DESCRIPTION OF THE DRAWINGS

To complete the invention being described, and in order to help understand the characteristics of the invention, according to a preferred embodiment thereof, it is accompanied by a set of drawings in which the figures described below have been represented, for purely illustrative purposes and should not be construed as limiting:

FIGS. 1a to 1h represent perspective views of each of the phases of the assembling process of the structure in a first embodiment of the invention.

FIGS. 2a to 2h represent perspective views of each of the stages of the assembling process of the structure in a second embodiment of the invention.

Figure 3:
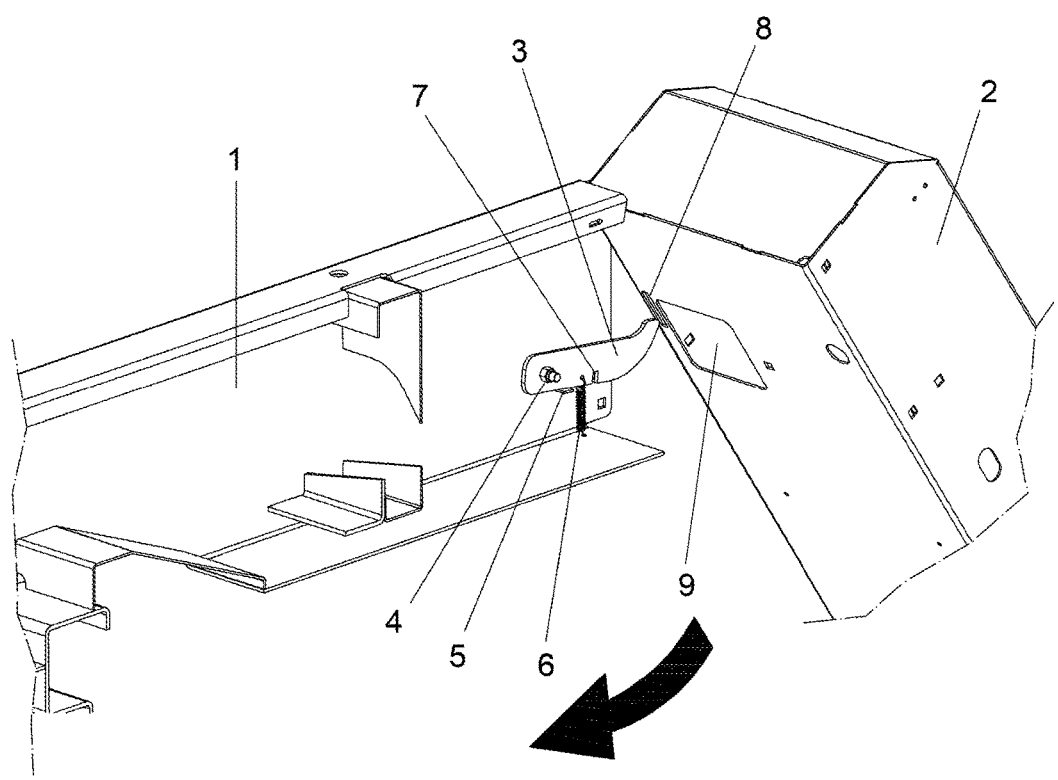
FIG. 3 represents a perspective view of the fixing system used in the invention in the process of being secured.
Figure 4:
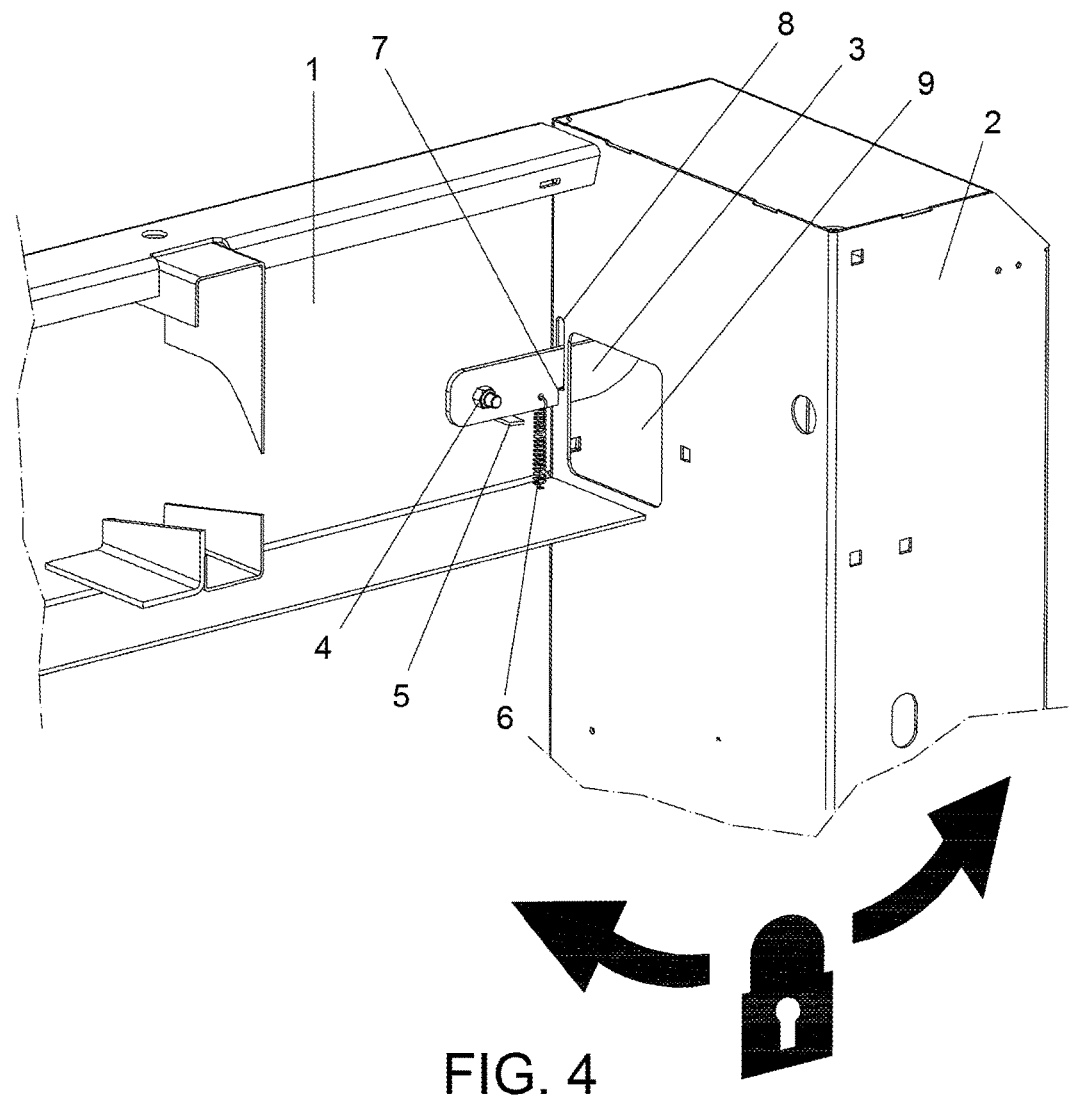
FIG. 4 represents a perspective view of the fixing system used in the invention in the final position after it has been secured.

Provided below is a list of the references used in the figures:
1. Crossbar.
2. Pillar.
3. Gusset plate.
4. Fixing point.
5. Protrusion.
6. Spring.
7. Slot.
8. Opening.
9. Window.

DESCRIPTION OF THE INVENTION

The present invention refers to a system for safely assembling washing machines for vehicles.

The washing machine includes a structure in the shape of a gantry including a crossbar (1) and a series of pillars (2). One of the embodiments of the invention includes a crossbar (1) on which two pairs of pillars (2) are fixed, each one on each end of the crossbar (1). The pillars (2) are fixed to the crossbar (1) by means of hinged joining means that allow the pillars (2) to rotate around the crossbar (1) until they reach a final position in which a series of fixing systems operate. In this way, the pillars (2) are definitely secured to the crossbar (1), with the gantry achieving a stable final position.

FIGS. 1*a*-1*h* and 2*a*-2*h* show two embodiments of the present invention, depending on the pillars (2) being arranged parallel or perpendicular to the crossbar (1).

FIGS. 1*a*-1*h* show the process of installing a washing machine in the first embodiment in which the pillars (2) are initially placed parallel to the crossbar (1). Additionally, in this embodiment each pair of pillars (2) can be joined at the free ends, with each pair of pillars adopting a "U" shaped configuration that provides better stability to the structure.

FIG. 1*a* shows the material piled up, just in the way it is transported in order to assemble a washing machine.

FIG. 1*b* shows how the crossbar (1) of the structure is placed and joined in parallel to the pillars (2) including the gantry by means of hinges, which are not represented in the drawings. The cleaning cylinders are set aside to be installed later once the structure of the washing machine has been erected.

FIGS. 1*c* to 1*e* show the different positions adopted by the gantry including the washing machine as it is lifted by a forklift truck to its final position in which the fixing systems operate, and the washing machine is secured in a stable position.

FIGS. 1*f* and 1*g* show the forklift truck transporting the washing machine to its final position.

FIG. 1*h* shows the washing machine already installed in its final position, incorporating the cleaning cylinders.

FIGS. 2*a*-2*h* show the process of assembling a washing machine in a second embodiment in which the pillars (2) are initially placed perpendicular to the crossbar (1).

FIG. 2*a* shows the material piled up, just in the way it is transported in order to assemble a washing machine, just as in FIG. 1*a*.

FIG. 2*b* shows the position of the crossbar (1) of the structure perpendicularly joined to the pillars (2) including the gantry by means of hinges. In this embodiment of the invention, the pillars are placed on the rails on which the washing machine will move. Just as with the first embodiment, the cleaning cylinders are also set aside in order to be installed later on.

FIGS. 2*c* to 2*e* show the same situations as FIGS. 1*c* to 1*e*, with the washing machine in the different positions as it is lifted by a forklift truck to its final position in which the fixing systems operate, and the washing machine is secured in a stable position.

FIGS. 2*f* and 2*g* show the forklift truck transporting the washing machine to its final position, just as FIGS. 1*f* and 1*g*.

Finally, FIG. 2*h* shows the washing machine already installed in its final position, just as FIG. 1*h*.

As mentioned above, one of the elements including the assembling system are hinged joining means in order to connect the pillars (2) to the crossbar (1). In either of the two embodiments shown in the drawings, as the forklift truck lifts the crossbar (1), the pillars (2) move from the horizontal position resting on the ground to the vertical position, ending in an orthogonal position in relation to the crossbar (1) and creating a characteristic gantry structure once the fixing systems come into operation to connect the pillars (2) to the crossbar (1). This movement of the pillars (2) is caused by the force of gravity, without having to use any support mechanism.

The final position of the pillars (2) may not be orthogonal to the crossbar and they may not end in a vertical position, but with a certain slope.

Each of the fixing systems used in the invention to keep the gantry including the washing machine in a rigid and stable structure includes a male-female system including a male component that is housed in a female component. The male and female components are located on the respective pieces of the structure that need to be secured, that is, the crossbar (1) on the one hand, and the pillars (2) on the other. In fact, in the embodiments shown in the drawings, the male components are located on the crossbar (1) and the female components are located on each of the pillars (2), with other possible configurations placing the male components on the pillars (2) and the female components on the crossbar (1), or even combinations thereof, including male and female components on the crossbar (1).

FIG. 3 shows the fixing system used in the invention in operation.

In order to do so, it must be highlighted that the pillars (2) include flat plates joined together in order to give the pillars (2) a hollow prism configuration.

The male component of the fixing system includes a rectangular gusset plate (3) that is fixed on the crossbar (1) on a fixing point (4) by means of a screw, a pin or a similar element, so that it can rotate around it. The gusset plate (3) protrudes at a determined length over the crossbar (1), which will be in charge of fixing it to the pillar (2). One of the protruding corners of the gusset plate (3) has a curved configuration. In an intermediate area of the gusset plate (3) there is a slot (7) configured to house an element of the pillar (2) being fixed. Preferably, this element housed in the slot (7) is one of the plates including the pillar (2). The gusset plate (3) remains in a stable position, resting on a protrusion (5) of the crossbar (1). This position is held by force by means of a spring (6) joining the crossbar (1) to the gusset plate (3).

The plate including the side of the pillar closer to the crossbar (1) has a rectangular opening (8) including the female component of the fixing system. The opening (8) is aligned transversally with the gusset plate (3) so that during the rotational movement of the pillar (2) toward the crossbar (1), the gusset plate (3) fits in the opening (8). In the same way, the opening (8) is aligned with the gusset plate (3) at a height, so that in the final fixing position, the edge of the opening that is furthest away from the hinge slides a certain length inside the slot (7) in order to prevent the pillar from rotating (2) in relation to the crossbar (1). Preferably, this edge makes contact with the end of the slot at the limit position. In this way, when the rotational movement of the pillar (2) toward the crossbar (1) begins by means of the hinged means joining them together, the moment the gusset plate (3) makes contact with the pillar (2) the gusset plate (3) starts entering inside the slot (8). Forced by the tensioner effect of the spring (6), the curved edge of the gusset plate (3) starts to slide over the edge of the opening (8) furthest from the hinge, pushed by this edge so that the gusset plate (3) rotates around the fixing point (4) up to the moment when the opening (8) reaches the position of the slot (7). In this moment, the plate of the pillar (2) fits inside the slot (7), returning the gusset plate (3) to its initial position resting on the protrusion (5), and acting as a latch by means of the effect of the spring (6). This moment coincides with the moment in which the pillar (2) reaches its final position, making contact with the crossbar (1).

The fixing system can only be released intentionally by operating the gusset plate (3), so that the gusset plate (3) is lifted in order to release the pillar (2) from the slot (7).

To release the system, a window (9) located by the opening (8) provides access to the free end of the gusset plate (3) so that it can be lifted in order to dislodge the slot (7) from the pillar (2).

It needs to be considered that the present invention is not limited by the embodiment disclosed herein. Other embodiments can be made by persons skilled in the art in light of this description. In consequence, the scope of the invention is defined by the following claims.

The invention claimed is:

1. A system for safely assembling washing machines for vehicles comprising a structure formed by a crossbar and a series of pillars fixed to the crossbar, the system comprising:
   a hinged joining arrangement between the pillars and the crossbar, and
   a fixing arrangement for securing each pillar to the crossbar that comprises:
      a male element comprising a gusset plate that pivots on a fixing point resting on a protrusion and which holds a forced position by a force of a spring, with the gusset plate having a curved edge and a slot; and
      a female element comprising an opening located on a plate and configured to house the gusset plate,
   so that:
      the male component is located on an element of the structure to be selected between the crossbar and the pillars, and the female component is located on the other of the crossbar and pillars not selected,
      the male component of the fixing arrangement is configured to be introduced in the female component of the fixing arrangement when the crossbar and the pillars, due to the hinged joining arrangement, are lifted until a final position is reached where the pillars are secured to the crossbar in a stable position, and
      the gusset plate enters the opening resting on the curved edge until the gusset reaches a position in which the plate fits inside the slot, causing the pillar to be fixed on the crossbar.

2. The system for safely assembling washing machines for vehicles according to claim 1, wherein the system comprises a window for accessing a free end of the gusset plate so that the fixing arrangements can be released.

* * * * *

UNITED STATES PATENT AND TRADEMARK OFFICE
CERTIFICATE OF CORRECTION

| | | |
|---|---|---|
| PATENT NO. | : 10,107,321 B2 | Page 1 of 1 |
| APPLICATION NO. | : 15/360119 | |
| DATED | : October 23, 2018 | |
| INVENTOR(S) | : Yolanda Tomas Puchades | |

It is certified that error appears in the above-identified patent and that said Letters Patent is hereby corrected as shown below:

In the Specification

Column 1, Line 7, delete "2016," and insert -- 2015, --

Signed and Sealed this
Twenty-second Day of January, 2019

Andrei Iancu
*Director of the United States Patent and Trademark Office*